Patented Oct. 30, 1951

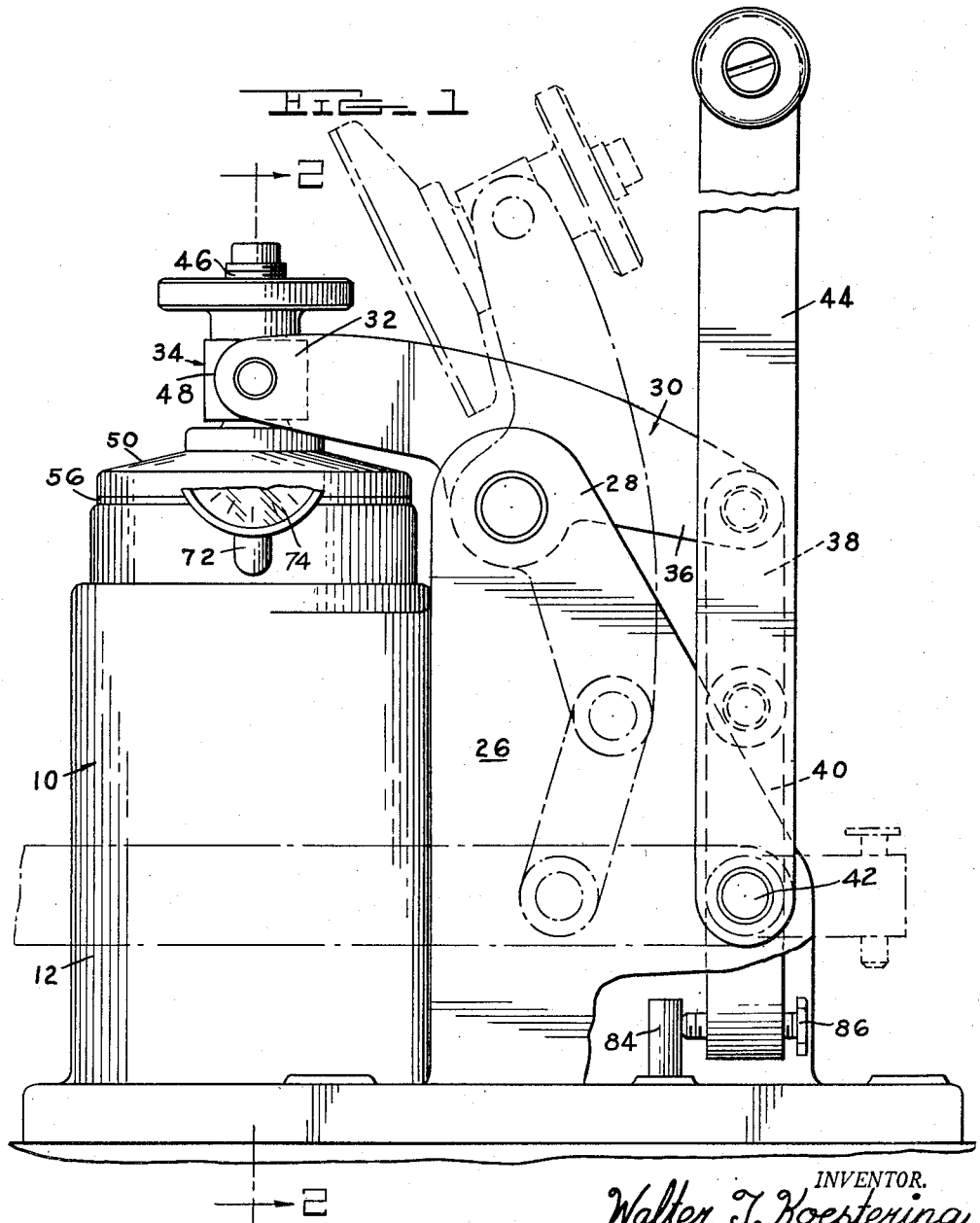

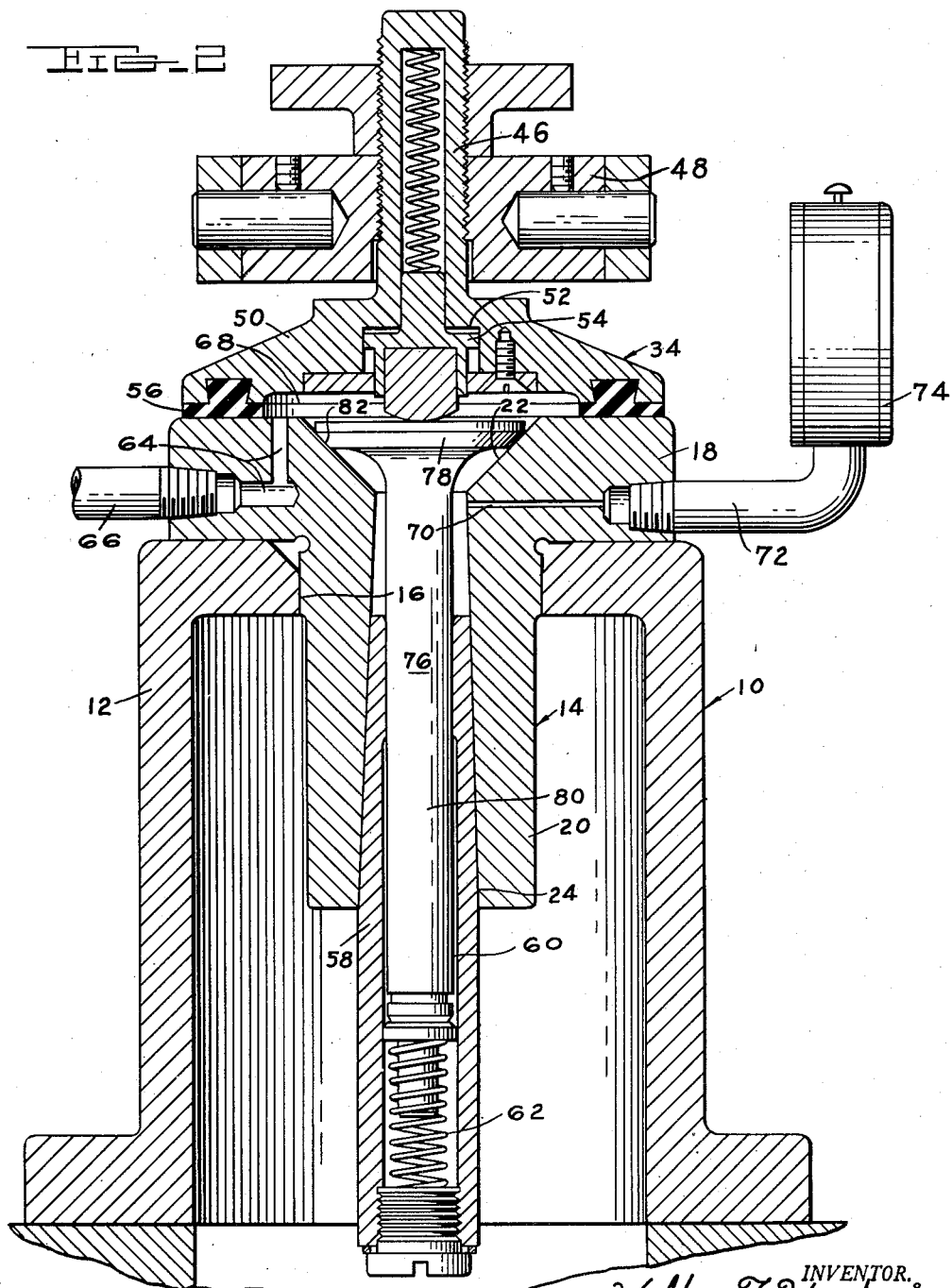

2,573,646

UNITED STATES PATENT OFFICE 2,573,646

VALVE TESTING APPARATUS

Walter T. Koestering, Battle Creek, Mich., assignor to Eaton Manufacturing Company, Cleveland, Ohio, a corporation of Ohio Application January 2, 1947, Serial No. 719,905

3 Claims. (Cl. 73—47)

This invention relates to poppet valves and more particularly to a device for testing the sealing qualities of the valves.

Broadly the invention comprehends the provision of a mechanism for testing the sealing qualities a poppet valve will have relative to a valve seat therefor wherein air under a given pressure is supplied to one side of the valve and the amount that leaks past the cooperating portions of the valve and valve seat is measured giving an accurate indication of the sealing qualities of the valve.

An object of the invention is the provision of a simple, expedient and economical device for testing the sealing quality of poppet valves.

Another object of the invention is the provision of means employing air under pressure for testing the sealing capabilities of valves.

A further object of the invention is the provision of air pressure apparatus for checking the sealing quality of valves.

A further object of the invention is the provision of means for testing the seats of valves for sealing efficiency wherein a valve to be tested is subjected under simulated operating conditions to air under a predetermined pressure and the amount of air that leaks past the sealing surface of the valve and associated valve seat is measured so as to give a visual means of determining the sealing qualities of the valve.

Other objects and advantages of the invention will appear from the following description taken in connection with the drawings, forming a part of the specification; and in which:

Fig. 1 is a side plan view of an apparatus for testing the sealing quality of valve seats, and Fig. 2 is a vertical cross sectional view taken along lines 2—2 Fig. 1.

The instant invention was devised for the purpose of providing means for simply, quickly, accurately and economically testing the sealing quality of poppet valves for internal combustion valves. The principle here employed is the placing of the valves to be tested in an apparatus simulating engine seating and valve guide supporting position and then delivering into a sealed chamber above the valve head, air at a predetermined pressure and then measuring the amount of the air that leaks past the seating surface of the valve and its associated seat. The amount of air leakage is read upon an appropriate scale that is graduated in accordance with the valve tests and thereby indicates the accepted or rejected state of the valves as pertains to valve seating qualities. By the provision of the present machine and method employed thereby it is possible to do away with the previous requirement of indicating the seating surface of the valves for concentricity and also eliminates any need for bluing the seating surface to make sure the seat is round and free of flat spots. Furthermore the valve seating surfaces can be ground with a rougher finish and still produce a valve acceptable for engine operational use.

Referring to the drawings for more specific details of the apparatus employed and method utilized thereby in carrying out the intent of the invention 10 refers generally to a fixture for testing engine poppet valves for their sealing qualities.

The fixture 10 comprises a hollow body portion 12 adapted to be bolted or otherwise suitably secured to a workbench, not shown, a valve seating member 14 fixedly secured in a bore 16 of body 12, including a radially extended portion 18 and an axially extended portion 20, said member 14 having a pair of tapered concentric bores 22 and 24 therethrough the purpose of which will hereinafter appear.

The body 12 is provided with a bearing supporting upright 26 integral therewith upon which is pivoted at a portion 28 a lever arrangement 30 having pivotally secured at one end 32 thereof a head member 34 that is adapted to cooperate concentrically with seating member 14 and at its other end 36 a link 38, said link in turn being secured at its front end to a lever 40 pivotally secured upon a shaft 42 journalled in framework 26. The shaft 42 has secured at one end thereof outside of bearing in the framework a manually actuable lever arm 44 the purpose of which will hereinafter appear.

The head member 34 includes an axially extended portion 46 that is adjustably secured upon a cross-bar 48 pivotally securing the head to lever 30, and a radial portion 50 that is adapted to cooperate with seating member 14. The member 34 is provided with a stepped bore 52 therein supporting a central axially movable spring tensioned plunger or ram 54 and a circumferential sealing ring 56 effective to seat upon the upper surface of member 14 so as to provide an airtight seal therebetween.

The bore 24 of member 14 is adapted to receive in press-fitted relation therein a valve guide 58 having a central opening 60 therethrough simulating the type of guide in which the valve is adapted to be supported during operational use and the bore 22 simulates a valve seat such as the valve seat with which the valve to be tested is associated. The guide 58 has arranged in one end of the opening 60 a spring pressed plunger 62 the purpose of which will hereinafter appear.

The member 14 is provided with air passages 64 in the radial portion thereof wherein a conduit 66 from an air pressure source, not shown, is coupled to the inlet of passages 64 and the passages have an outlet in the upper surface such that when the head member 30 is in closed relation upon the member 14 the passage communicates with a chamber 68 formed between the heads.

The radial portion 18 of member 30 is also provided with an air exhaust passage 70 communicating with bore 24 adjacent the entrance to bore 22 and also communicating by way of conduit 72 with a leakage recording gauge 74.

In a normal operation of apparatus 10 and process employed thereby a poppet valve 76 of conventional design including a mushroom shaped head 78 and stem 80 is inserted in the bores 22 and 24 of member 14 and in the opening 60 of guide 58 and is adapted to be guided thereby as under normal operating conditions with the end of stem in abutting relation upon spring pressed plunger 62 such that when the valve to be tested is held in a position off of valve seat 82 formed by bore 22. With the valve inserted in the guide the lever 44 is manipulated from dotted line position to full line position as shown by Fig. 1 resulting in actuating lever 40 secured to shaft 42, link 38, and lever 30 resulting in moving the head 34 from dotted line position to full line position in sealing cooperation with member 14 so as to provide the sealed chamber 68 therebetween.

The movement of lever 40 through the action of lever 44 is limited in one direction by a stop mechanism 84 which is adapted to be engaged by an adjusting screw secured to free end 86 of lever 40, thereby effectively resisting movement of manually operable lever 44 beyond a predetermined desired point.

Simultaneously with the clamping of head 34 to sealing position upon member 14 with sealing ring in effective sealing relation thereto the plunger 54 abuts the upper head portion of valve 76 forcing the valve to seated sealing position on seat 82 and resiliently maintains the valve upon the seat with a force simulating normal spring sealing pressure for said valve tested.

Concomitantly with the sealing of head 34 upon member 14 through the action of lever 44, the lever operates to actuate valve mechanism, not shown, permitting of the delivery of air under a predetermined pressure from a source, not shown, by way of conduit 66 and air passages 64 to chamber 68. Upon the admission of air under pressure to chamber 68, the head of the valve is subjected to the air under pressure and is held to its seated position. The sealing quality of the valve is then determined by measuring the amount of air leaking past the valve and valve seat on gauge 74 provided for said purpose. The gauge is so predeterminedly graduated that the quantity of air leaking past the valve and exhibited thereon immediately establishes the condition of the valve as to whether or not it is acceptable for use. With the completion of a testing operation the valve is partially ejected by the spring plunger 62 when the head 34 is released upon manual actuation of the lever mechanism controlling movement of head, and the valve that has been tested is removed from the test fixture. Simultaneously with the release of the head 34 from sealing position with member 14 the air under pressure is shut off. The fixture is then in readiness for the insertion and testing of subsequent valves of a like nature and size as valves with which the member 14 provides proper associated sealing and guiding relation. This completes a testing operation cycle.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A fixture for checking the sealing qualities of valves comprising a body member having a central opening therethrough providing separate valve seating and guiding means therein, resilient means for normally holding a valve to be tested off the seating surface when inserted in the opening of the body, a closure member adapted to be arranged upon the upper surface of the body member in sealing engagement therewith when the valve is inserted in the opening having a resilient plunger for abutting and holding the valve to be tested under simulated seating operating conditions upon the seating surface and forming a chamber between the top of the valve head and the closure member, a controlled air pressure source communicating with the chamber and an air leakage measuring device communicating with the central opening in the body between the valve guiding and seating means.

2. A fixture for checking the sealing quality of valves comprising a body member having a separate valve seating and guiding means therein, resilient means for normally holding a valve to be tested off the seating surface when inserted in the opening of the body member, a closure member adapted to be arranged upon the upper surface of the body member in sealing engagement therewith when the valve is inserted in the opening having a resilient plunger for abutting and holding the valve to be tested under simulated seating operating conditions upon the valve seating surface and forming a chamber between the upper side of the valve and the closure member, a controlled air pressure source communicating with the chamber, and an air gauge for measuring the air leakage past the valve seating surface.

3. A fixture for checking the sealing qualities of poppet valves comprising a body member including a valve seating and valve stem guiding means therein, a pivotally mounted closure member adapted to seal upon the head portion of the body and form a chamber between itself and the valve seating means, said closure having a resilient mechanism therein adapted to impose a load on the valve when in seated testing position simulating seating operating conditions, a controlled source of air under a predetermined pressure that is delivered to the chamber and means communicating internally of the body between the seating means and guiding means for measuring the amount of air that leaks past the valve seating means when a valve is arranged in sealing and guiding position and is subjected to air under predetermined pressure delivered from the air source.

WALTER T. KOESTERING.

REFERENCES CITED

The following references are of record in the file of this patent:

UNITED STATES PATENTS

| Number | Name | Date |
|---|---|---|
| 1,337,132 | Harpst | Apr. 13, 1920 |
| 1,337,390 | Coleman | Apr. 20, 1920 |
| 1,649,287 | Butler | Nov. 15, 1927 |
| 1,703,824 | Justice | Feb. 26, 1929 |
| 1,764,616 | Fleming | June 17, 1930 |
| 2,212,466 | Bradford | Aug. 20, 1940 |
| 2,467,552 | Graves | Apr. 19, 1949 |

FOREIGN PATENTS

| Number | Country | Date |
|---|---|---|
| 391,218 | Great Britain | Apr. 24, 1933 |